United States Patent [19]
Terry

[11] 3,906,741
[45] Sept. 23, 1975

[54] CHASSIS FOR AN ASSEMBLY

[76] Inventor: Burton Alexander Terry, 7 Peru Ct., Mount Waverly, Victoria, Australia

[22] Filed: Mar. 18, 1974

[21] Appl. No.: 451,938

[30] Foreign Application Priority Data
Mar. 21, 1973 Australia.............................. 2695/73

[52] U.S. Cl..................................... 62/262; 62/429
[51] Int. Cl............................................. F25d 23/12
[58] Field of Search............................... 62/262, 429

[56] References Cited
UNITED STATES PATENTS

| | | | |
|---|---|---|---|
| 2,751,760 | 6/1956 | Williams | 62/289 |
| 2,939,297 | 6/1960 | Karger | 62/262 |
| 3,289,433 | 12/1966 | Abbott | 62/429 |
| 3,724,233 | 4/1973 | Pugh | 62/262 |
| 3,741,290 | 6/1973 | Nenadal | 62/262 |
| 3,756,039 | 9/1973 | Riello | 62/262 |
| 3,766,749 | 10/1973 | Livesay | 62/262 |
| 3,819,244 | 6/1974 | Paulick | 62/262 |

Primary Examiner—William J. Wye
Attorney, Agent, or Firm—Christie, Parker & Hale

[57] ABSTRACT

A chassis for an assembly of spaced apart elements in which the chassis comprises a shell of structural material integrally formed with mounts for the elements of the assembly and with operational passages between the elements. The chassis is particularly well suited to adaptation as a chassis for an air conditioner unit.

22 Claims, 5 Drawing Figures

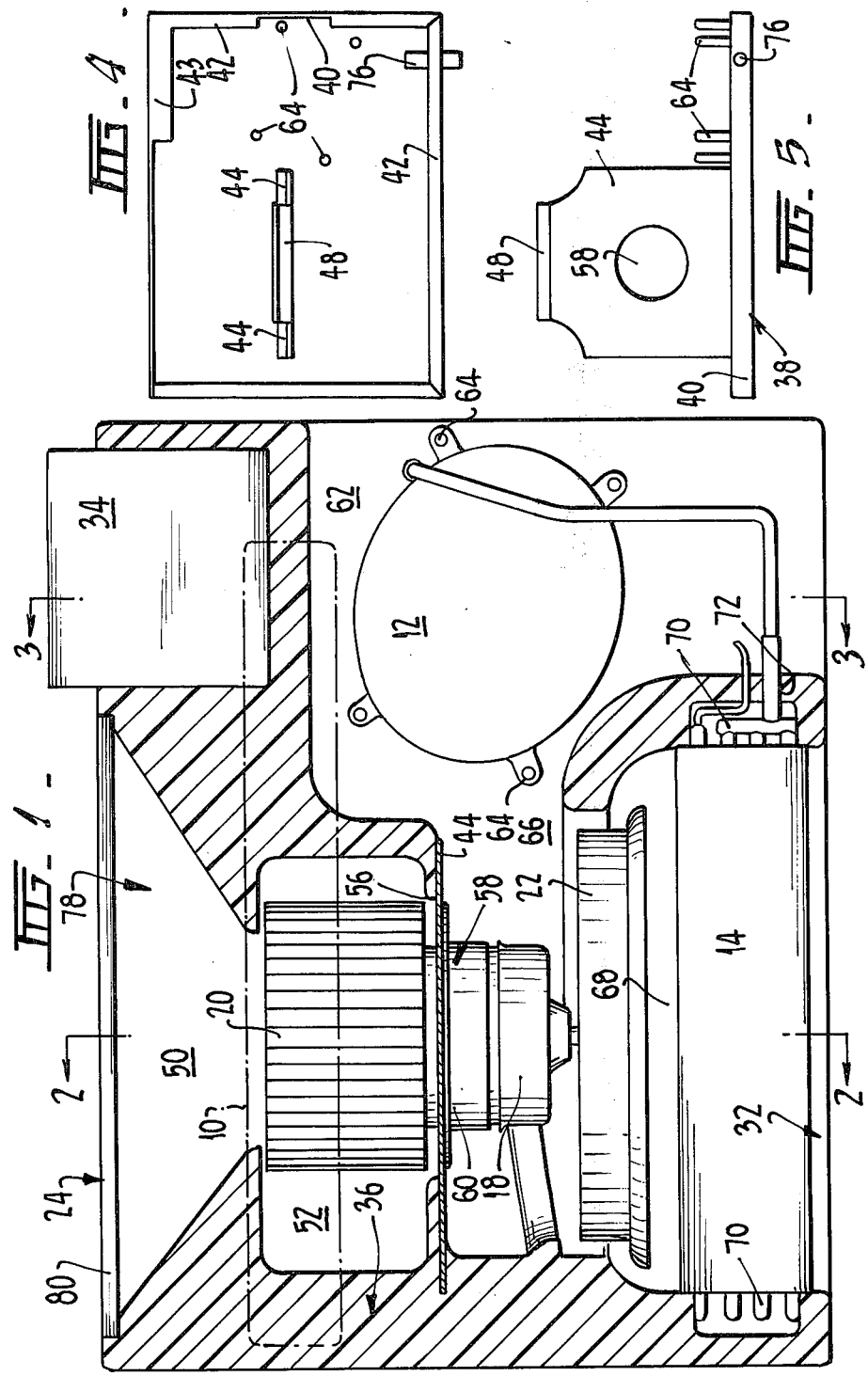

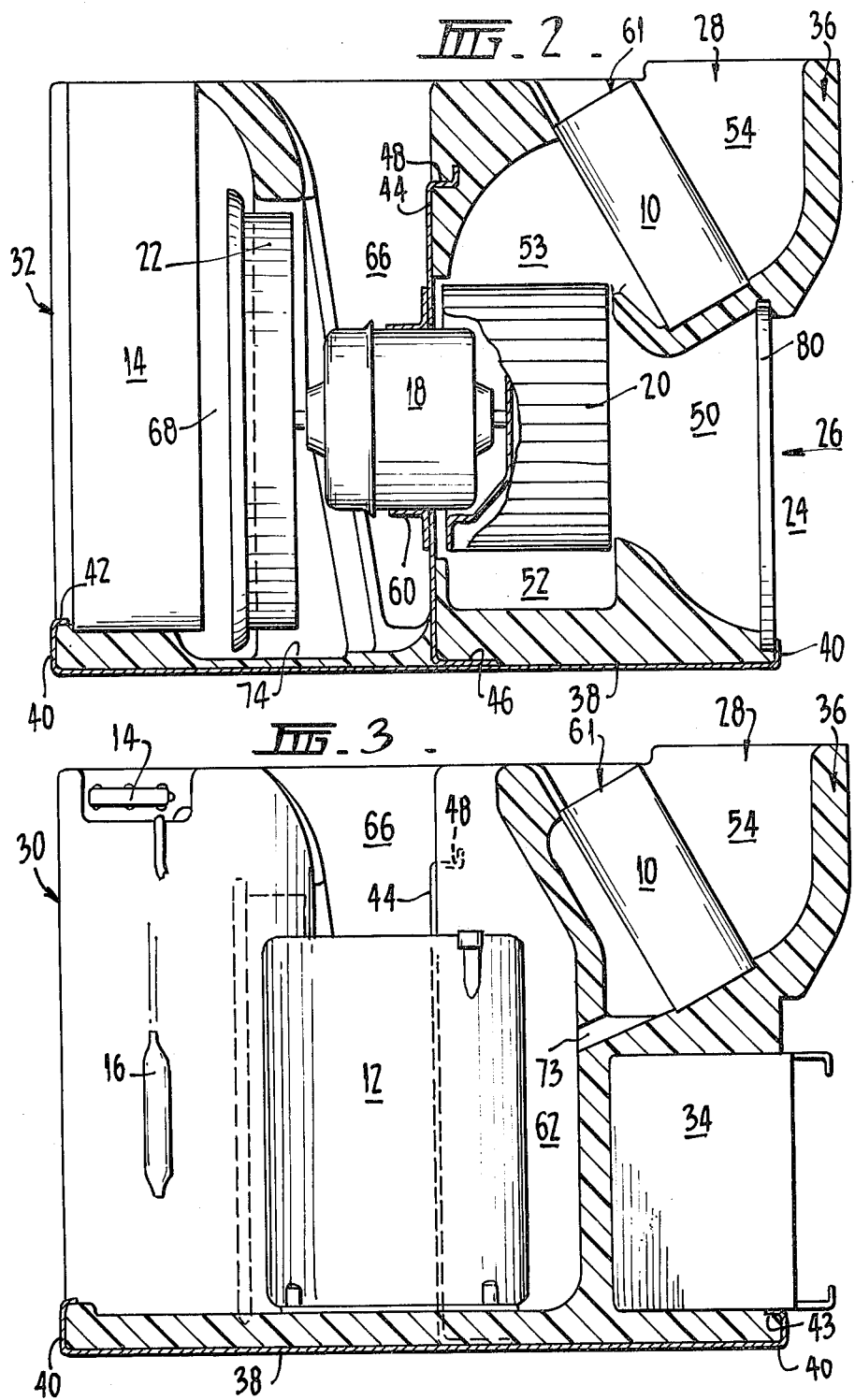

CHASSIS FOR AN ASSEMBLY

The present invention relates to a chassis for an assembly, particularly but not exclusively an assembly which in use forms part of an air conditioner unit.

As is well known, air conditioner units at present in use include an assembly of a number of preconstructed parts. The common practice is to form a chassis to receive these parts, the chassis with the parts mounted upon it being inserted in a decorative casing. The usual form of construction for the chassis involves the use of a frame with mounting brackets, fixing screws, and various supports for the parts, and the assembly of the unit is quite a skilled task involving a considerable amount of labour time. Also, the conventional manufacturing procedure involves the separate manufacture of a large number of individual components, in particular the mounting portions of the chassis, and the air ducting which has to be incorporated in the eventual unit. This ducting is commonly made of sheet metal. Its formation in a manner which will minimise noise in the eventual unit is quite complex and therefore a considerable addition to the cost of the overall unit.

It is accordingly an object of the invention to provide an air conditioning unit of a structure and assembly simpler than those hitherto known.

According to a first aspect of the invention there is provided a chassis for an assembly, characterized in that a part of the chassis which in use provides a mounting for an element of the assembly is made of a structural material formed so as to enable the element to be mounted on the chassis by co-operation with said part and without auxiliary fastenings, or formed with the element in place and thereafter locating the element relative to the chassis by co-operation with the element and without auxiliary fastenings.

In a second aspect, the invention provides a chassis for an assembly which in use causes movement of fluid through the assembly, the chassis comprising a shell of structural material provided with a mount for an element of the assembly and with a passage along which said fluid can flow in a desired manner in use, the passage being interconnected with said mount so that the element is at least partly exposed to the passage when mounted on the shell by said mount.

The mount may comprise guide tracks to receive and locate the element.

According to a third aspect of the invention, there is provided an air conditioner unit comprising a chassis formed as a shell of structural material, which shell is so shaped as to define a first passage for the flow of primary air to be cooled and a second passage for the flow of secondary air to carry away heat extracted from the primary air flowing in the first passage, and means to effect cooling of the primary air flowing in the first passage and to transfer the thus extracted heat to the secondary air flowing in the second passage.

In a still further aspect, the invention provides a chassis for an assembly characterised in that a part of the chassis which in use provides a mount for an element of the assembly comprises a guideway or mounting surface formed of an expanded structural material.

The chassis or unit may include a strengthening portion made of a material which is relatively dense in relation to said structural material.

The structural material may comprise an expanded structural material.

Preferably the structural material is a plastics material which is advantageously of a high density, monocellular type and is substantially air impermeable.

By way of example, one embodiment of the invention will now be described with reference to the accompanying diagrammatic drawings, in which:

FIG. 1 is a plan view of part of an air conditioning unit incorporating a chassis in accordance with the invention, sectioned at about the vertically centre horizontal plane, FIG. 2 is a sectioned elevation on the line 2—2 in FIG. 1, FIG. 3 is a section elevation on the line 3—3 in FIG. 1, FIG. 4 is a plan view of a tray forming part of the chassis shown in FIGS. 1 to 3, and FIG. 5 is a side elevation of the tray shown in FIG. 4.

The illustrated air conditioner unit comprises conventional fluid cycle equipment including an evaporator 10, a refrigerant compressor 12 and a condenser 14 with a drier 16 between the compressor and the condenser. The unit also comprises a motor 18 operable to drive a pair of impellers 20 and 22. As explained below, impeller 20 is arranged to draw warm primary air from a space within a building through an opening 24 in the front of the chassis (as represented by arrow 26 in FIG. 2). The air thus drawn in is cooled by being blown through evaporator 10, and then returned to the space through an opening 28 in the top of the chassis. Impeller 22 is arranged to draw ambient secondary air from the building exterior into the unit (as represented by arrow 30, FIG. 3) and to blow it through the condenser to cause condensation of the working fluid therein. The now-heated secondary air is then returned to the exterior via opening 32 in the rear of the chassis. The unit also comprises a control box 34 mounted in the front face of the chassis so as to be readily accessible to the user to enable control of air temperature, quantity, etc. All the above items of equipment are of conventional construction and they are arranged in a substantially conventional layout in the complete unit. Accordingly, they will not be described in detail except in so far as is necessary to highlight various aspects of the present invention.

The conventional practice in mounting elements such as those referred to above is to form a chassis comprising a framework fitted with mounting brackets to which the individual elements are connected. In the present case, the elements are mounted in a shell 36 of expanded plastics material, the shell providing the ducting required to channel the primary and secondary air flows within the unit. Shell 36 is formed by moulding of the plastics material on a rectangular metal tray 38. With particular reference to FIGS. 4 and 5, the metal tray 38 has shallow side walls 40 provided along most of their upper periphery with an inturned lip 42, which is bedded in the shell (FIGS. 2 and 3) and serves to connect the two parts firmly together. About midway between the front and back walls of the tray, and on the left hand side thereof as seen in FIG. 4, a bulkhead 44 is spot welded to the floor of the tray by way of an integral foot 46. Bulkhead 44 has a flanged portion 48 at its upper end, and this, together with foot 46 and the left hand edge of the bulkhead, is moulded into an internal wall of shell 36 so that the bulkhead is firmly connected with the latter (FIG. 2). As will be described hereinafter, bulkhead 44 provides a mounting for the impeller drive motor 18.

At the front, right-hand edge of the tray as viewed in FIG. 4, a portion 43 of lip 42 is extended inwardly from side wall 40 to a slightly greater extent than the rest of the lip, and prior to moulding of shell 36, the control box 34 is secured to this portion 43 of the lip by a pair of screws. The control box will thereafter be moulded into the shell and will be retained in the chassis primarily by reason of its engagement with the material of the shell. The screws act to locate the control box during the moulding step and also provide an earth connection between the control box and the metal tray of the chassis.

Shell 36 is formed in a mould, split approximately along the vertical centre line of the chassis. Suitable cores are incorporated in the mould to enable formation of a primary air intake passage 50 extending from the opening 24 in the front face of the chassis to a scroll-shaped chamber 52 which in use receives the impeller 20. Chamber 52 communicates via a passage 53 with a gallery-like chamber 54 which extends across most of the width of the chassis just below the top face thereof and communicates with the correspondingly shaped primary air outlet opening 28 in the top face.

Passage 50 and chamber 52 are formed in line with the bulkhead as shown in FIG. 1, and the rear wall of chamber 52 has an opening 56 in alignment with an opening 58 in the bulkhead. After formation of the shell, impeller 20 can be passed into the chamber through these aligned openings and motor 18 mounted in the openings by means of a mounting ring 60.

Shell 36 is formed with a subsidiary opening 61 in its upper face communicating with the gallery chamber 54. Opening 61 is located adjacent opening 28 and is so formed that the evaporator 10 which is rectangular, can be pushed through opening 61 into guideways which form a mount for the evaporator and are so formed in the side walls of the gallery chamber, that the evaporator is a friction fit in the guideways. When thus located, the evaporator divides the gallery chamber 54 so that in use primary air being forced from impeller 20 is channelled through the evaporator before being expelled from the unit.

Immediately behind control box 34 the shell is formed with a space 62 to receive compressor 12 and the space is continued to both the rear wall and the adjacent side wall of the chassis.

The whole side wall of the chassis behind the control box is thus open to facilitate insertion of the compressor and adjustment of the interconnecting pipes. Four set screws 64 (FIG. 5) are countersunk into tray 38 so as to project up into space 62 after formation of the shell, thus enabling firm mounting of the compressor relative to the chassis.

Behind bulkhead 44, a passage 66 extends to a chamber 68 which contains impeller 22 and communicates with the rear secondary air outlet opening 32. The rear opening 32, chamber 68 and the opening between chamber 68 and passage 66 are large enough to permit insertion of motor 18 with its two impellers as a unit through opening 32. Just inside this opening the walls of chamber 68 are formed with guide tracks 70 and the chamber is open to the top face of the chassis so that condenser 14 can be pushed into the guide tracks and located thereby in the same way as evaporator 10 is located by its tracks. Guide tracks 70 thus constitute a mount for evaporator 10. The internal walls of the shell 36 are formed with openings such as those at 72 (FIGS. 1 and 3) through which interconnecting pipes extend between the evaporator, compressor and condenser.

The floor of chamber 68 beneath impeller 22 is formed to provide a recess 74 in which water will collect in use. Water from this recess is picked up by the impeller and thrown against the condenser where it vapourises, withdrawing heat from the condenser unit. The depth of the recess beneath impeller 22 determines the maximum depth of water in which the impeller must run to prevent overload of the impeller. Overflow from recess 74 passes over a weir-like portion (not seen in the drawings) to a channel which runs from the compressor towards the rear edge of the unit. At the point where the channel meets the edge of the tray, the wall of the latter is provided with an overflow pipe 76 (FIG. 5) through which the water can pass.

Although it is not shown in the drawings, the front wall of the shell 36 on the lower side of the primary air intake, for instance at about the location 78 (FIG. 1) is moulded with a recess to receive a capacitor which forms part of the starter circuit for the compressor motor. The provision of this capacitor is standard in air conditioning units. It develops a quantity of heat in operation of the unit, and it is desirable therefore to locate it in a cooling air stream. The recess may be sufficient to locate the capacitor, or a special strap may be provided to pass over the top of the recess after the capacitor has been located in it. Since the capacitor is liable to burn out, it must be readily replaceable.

In use, a filter screen 80 is mounted across the primary air intake 24 so that primary air passing from the room space into the chamber 52 must pass through the filter. Screen 80 is mounted in a pair of opposed, vertically opening slots in the upper and lower walls of the intake respectively, the upper slot being deeper than the lower slot so that the screen must first be pushed into the upper slot and then permitted to fall into and be located by the lower slot. It will be noted from FIG. 4 that the side wall of the tray is not lipped in this region as indicated at 45. A thermostat sensing probe (not shown) may extend from the control box across into the primary air intake so as to measure the temperature of the air drawn into the unit. The probe would be part of a thermostat in the control box which is moulded into the shell at the time of the formation of the latter.

In use, the top wall of the chassis is closed by a separately formed sheet of expanded plastics material with a louvered opening in alignment with primary air outlet opening 28. The chassis is then mounted in a casing which itself is mounted in the wall of the building with the open front face of the casing facing into the space to be conditioned and the rear face projecting into the open air. The chassis is inserted through an open front face of the casing with overflow pipe 76 passing through an opening in the rear face of the casing. The open front face of the casing is then closed by a decorative facia panel. It will be noted from FIGS. 2 and 3 that the upper front portion of shell 36 is spaced slightly forwardly of the front edge of the tray so as to leave a gap of a few inches between the lower edge of the facia panel and the tray, thereby permitting insertion and removal of filter screen 80 through this gap. In addition intake primary air will be drawn into the unit through the gap between the facia panel and the tray. The facia panel would of course be provided with suitable openings to permit control shafts to extend from the control box 34 through the facia panel.

Since the primary air outlet formed by the opening 28 and the complementary opening in the casing faces upwardly, primary air leaving the unit is blown directly upwardly and falls over the space being conditioned. The rearward face of the casing is provided with two sets of louvres, one set being in register with the rear secondary air intake opening permitting communication with the compressor space 62. Impeller 22 can therefore draw secondary air through space 62 and passage 66 and into the impeller chamber 68. A second set of louvres is provided in register with the secondary air outlet 32, and the louvers of this set are directed so that air leaving the unit wall, as far as possible, be kept separate from the secondary air entering the unit via the first set of louvres. Any rain entering through the louvres will pass into the recess 74 and from there to the channel leading to pipe 76.

The expanded plastics material is preferably a high density, foam material forming monocellular foamed structure and preferably treated to render it fire retardant. The density may be in the range 4–8 lbs. per cubic foot, a density of 5 lbs. per cubic foot being suitable. The material may be from the vinyl, styrene or urethane families, and it is believed that a material which will be sold by I.C.I. under the name "HEXAFOAM" will be particulary suitable. The material may have a tensile compression strength in the range 50–75 lbs. per square inch. In the event a monocellular foam is used, the material will be substantially air and water impermeable, and this is desirable though not absolutely essential. The material will probably be adhesive when forming in the mould and so will form a good connection with the tray, bulk and control box.

The invention provides many advantages in the manufacture of air conditioning units. The task of assembly of the unit is greatly simplified, so that it can now be performed relatively quickly and with a lesser requirement for skill. The separate manufacture of large numbers of parts, particularly fastenings such as, for example, brackets and fixing screws is now eliminated. Also the air ducting within the chassis is produced simultaneously with the chassis by a relatively simple moulding procedure. Using this production method, the air flow ducts can very easily be streamlined to minimise noise due to air turbulence in the ducts. Also, the expanded plastics material acts to some extent as a sound absorbing medium, further reducing noise emanating form the unit when in use.

The invention is not limited to details of the embodiment illustrated in the drawings. In particular, it will be understood that it is not limited to any specific layout of the parts of the air conditioning unit. Further, the invention may find application to the construction of a chassis for equipment other than an air conditioning unit.

I claim:

1. A chassis for an air conditioner unit comprising: a molded shell of an expanded plastics material; a first passage defined by said shell for the flow of primary air to be cooled; respective spaced apart primary air inlet and outlet openings in the shell communicating the exterior of the shell with the first passage, the first passage including an intake chamber which converges inwardly of the inlet opening; a second passage defined by said shell for the flow of secondary air to carry away heat extracted from the primary air flowing in the first passage; respective secondary air inlet and outlet openings in the shell communicating the exterior of the shell with the second passage; a structure for detachably and sealingly mounting a motor between the first and second passages with a drive shaft of the motor projecting into each of the passages for driving respective impellers to draw air through the passages, at least one of the primary and secondary air inlet and outlet openings being so formed and disposed as to permit such a motor to be passed therethrough and mounted to said structure, and a further opening in the shell communicating the exterior of the shell with the first passage for passing an evaporator therethrough into a disposition transversely of the passage, the further opening being associated with means in the first passage to detachably retain the evaporator in such a disposition.

2. A chassis according to claim 1 including a base plate supporting said shell, the base plate being of substantially greater mass density and strength than the expanded plastics material of the shell.

3. A chassis according to claim 2 wherein said structure comprises a bulkhead fixedly secured to the base plate.

4. A chassis according to claim 1 wherein the first passage further includes an impeller chamber disposed adjacent said structure in direct communication with the intake chamber, for receiving an impeller driven by the motor, and an evaporation chamber communicating the impeller chamber with the primary air outlet opening, the said disposition of the evaporator being within and transversely of the evaporation chamber and the general direction of airflow in the evaporation chamber being at an angle between about 270° and 360° to the general direction of airflow in the intake chamber.

5. A chassis according to claim 1 including a condenser opening in the shell communicating the exterior of the shell with the second passage for passing a condenser therethrough into a disposition transversely of the second passage, the condenser opening being associated with means in the second passage to detachably retain the condenser in such a disposition.

6. A chassis according to claim 5 including a base plate supporting said shell, the base plate being of substantially greater mass density and strength than the plastics material of the shell.

7. A chassis according to claim 6 wherein said structure comprises a bulkhead fixedly secured to the base plate.

8. A chassis according to claim 5 wherein the secondary air inlet opening is dimensioned to permit insertion and detachable mounting of a refrigerant compressor in the shell adjacent the air inlet opening.

9. A chassis according to claim 5 wherein the first passage further includes an impeller chamber disposed adjacent said structure in direct communication with the intake chamber, for receiving an impeller driven by the motor, and an evaporation chamber communicating the impeller chamber with the primary air outlet opening, the said disposition of the evaporator being within and transversely of the evaporation chamber, and the general direction of airflow in the evaporation chamber being at an angle between about 270° and 360° to the general direction of airflow in the intake chamber.

10. A chassis for an air conditioner unit comprising:
a molded shell of an expanded plastics material;
a first passage defined by said shell for the flow of primary air to be cooled;
respective spaced apart primary air inlet and outlet openings in the shell communicating the exterior of the shell with the first passage;
a second passage defined by said shell for the flow of secondary air to carry away heat extracted from the primary air flowing in the first passage;
respective secondary air inlet and outlet openings in the shell communicating the exterior of the shell with the second passage;
a structure for detachably sealingly mounting a motor between the first and second passages with a drive shaft of the motor projecting into each of the passages for driving respective impellers to draw air through the passages, at least one of the primary and secondary air inlet and outlet openings being so formed and disposed as to permit such a motor to be passed therethrough and mounted to said structure; and
a further opening in the shell communicating the exterior of the shell with the second passage for passing a condenser therethrough into a disposition transversely of the second passage, the further opening being associated with means in the second passage to detachably retain the condenser in such a disposition.

11. A chassis according to claim 10 further including a base plate supporting said shell, which base plate is of substantially greater mass density and strength than the plastics material of the shell.

12. A chassis according to claim 11 wherein said structure comprises a bulkhead fixedly secured to the base plate.

13. A chassis according to claim 10 including a recess formed in a floor portion of the second passage adjacent the said structure to contain fluid to be flung onto the condenser by an impeller driven by the motor.

14. A chassis according to claim 13 wherein said floor portion forms part of a lower portion of said shell which is planar to its exterior and contains no exterior protuberance arising from the presence of the recess in its interior surface.

15. A chassis according to claim 10 wherein the secondary air inlet opening is dimensioned to permit insertion and detachable mounting of a refrigerant compressor in the shell adjacent the air inlet opening.

16. A chassis for an air conditioner unit comprising:
a. a molded shell of an expanded plastics material;
b. a base plate supporting said shell, which base plate is of susbtantially greater mass density and strength than the plastics material of the shell;
c. a first passage defined by said shell for the flow of primary air to be cooled;
d. respective spaced apart primary air inlet and outlet openings in the shell communicating the exterior of the shell with the first passage;
e. a second passage defined by said shell for the flow of secondary air to carry away heat extracted from the primary air flowing in the first passage;
f. respective secondary air inlet and outlet openings in the shell communicating the exterior of the shell with the second passage, the second passage including an intake chamber which converges inwardly of the secondary air inlet opening, an impeller chamber into which the intake chamber opens and a condensation chamber communicating the impeller chamber with the secondary air outlet opening;
g. a bulkhead fixed to the base plate and separating the first passage and the secondary air impeller chambers but having an opening providing communication between the first passage and impeller chamber;
h. an impeller motor mounted in the said bulkhead opening so as to sealingly isolate the first passage from the impeller chamber and having respective oppositely directed drive shafts projecting into the first passage and the impeller chamber;
i. respective primary and secondary air impellers mounted on the drive shafts for rotation therewith within the first passage and the impeller chamber respectively;
j. an evaporator detachably mounted within and transversely of the first passage, the evaporator being associated with an opening in the shell through which it may be inserted or withdrawn; and
k. a condenser detachably mounted within and transversely of the condensation chamber, the condenser being associated with an opening in the shell through which it may be inserted or withdrawn.

17. A chassis according to claim 16 wherein the bulkhead, motor and impellers, the secondary air impeller and condensation chambers and outlet opening are arranged generally in linear succession in the shell and are so dimensioned that the motor and impellers may be passed from the exterior of the shell through the secondary air outlet opening to their mounting in the bulkhead.

18. A chassis according to claim 16 in which
a. the first passage includes an intake chamber which converges inwardly of the primary air inlet opening, a scroll-shaped impeller chamber into which the intake chamber opens and an evaporation chamber communicating the impeller chamber with the primary air outlet opening such that general direction of airflow in the evaporation chamber is at an angle between about 270° and 360° to the general direction of airflow in the intake chamber;
b. the bulkhead is fixed to the base plate and separates the primary and secondary air impeller chambers but has an opening providing communication between these chambers;
c. the impeller motor mounted in the said bulkhead opening so as to sealingly isolate the impeller chambers from each other and has respective oppositely directed drive shafts projecting into the impeller chambers;
d. the respective primary and secondary air impellers are mounted on the drive shafts for rotation therewith within the respective impeller chambers; and e. the evaporator is detachably mounted within and transversely of the evaporation chamber, the evaporator being associated with an opening in the shell through which it may be inserted or withdrawn.

19. A chassis according to claim 18 including a recess formed in the bottom of the secondary air impeller chamber for retaining liquid to be flung onto the condenser by the secondary air impeller; and a refrigerant compressor detachably mounted in the secondary air intake chamber, the secondary air inlet opening being dimensioned to permit the compressor to be passed therethrough.

20. A chassis according to claim 18 wherein the primary air impeller chamber, the bulkhead, motor and impellers, the secondary air impeller and condensation chambers and outlet opening are arranged generally in linear succession in the shell and are so dimensioned that the motor and impellers may be passed from the exterior of the shell through the secondary air outlet opening to their mounting in the bulkhead.

21. A chassis according to claim 16 in which a. the first passage includes an intake chamber which converges inwardly of the primary air inlet opening, a scroll-shaped impeller chamber into which the intake chamber opens and an evaporation chamber communicating the impeller chamber with the primary air outlet opening such that general direction of airflow in the evaporation chamber is at an angle between about 270° and 360° to the general direction of airflow in the intake chamber;

b. the bulkhead is fixed to the base plate and separates the primary air impeller chamber and the second passage but has an opening providing communication between the second passage and the impeller chamber;

c. the impeller motor is mounted in said bulkhead opening so as to sealingly isolate the impeller chamber from the second passage and has respective oppositely directed drive shafts projecting into the second passage and impeller chamber;

d. the respective primary and secondary air impellers are mounted on the drive shafts for rotation therewith within the second passage and impeller chamber respectively; and e. the evaporator is detachably mounted within and transversely of the evaporation chamber, the evaporator being associated with an opening in the shell through which it may be inserted or withdrawn.

22. A chassis according to claim 21 wherein the primary air impeller chamber, the bulkhead, motor and impellers and the secondary air outlet opening are arranged generally in linear succession in the shell and are so dimensioned that the motor and impellers may be passed from the exterior of the shell through the secondary air outlet opening to their mounting in the bulkhead.

* * * * *